Aug. 18, 1970          G. NUGHES                3,524,568
                  PACKAGE FOR FOODSTUFFS
                   Filed March 5, 1968
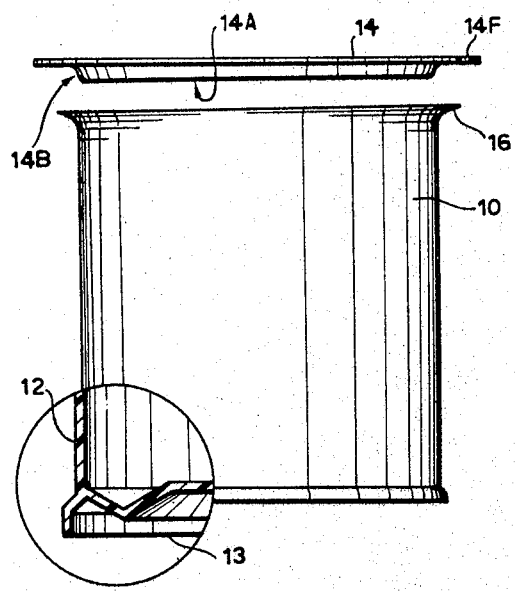
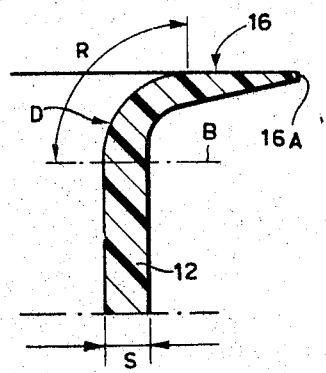
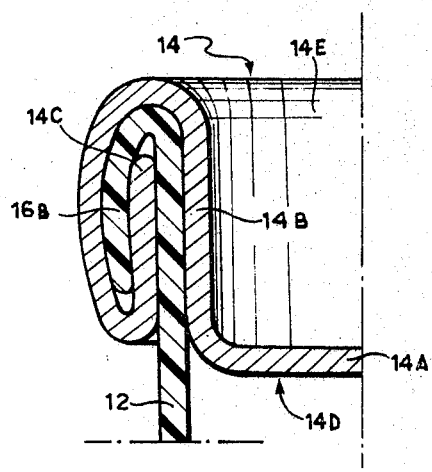
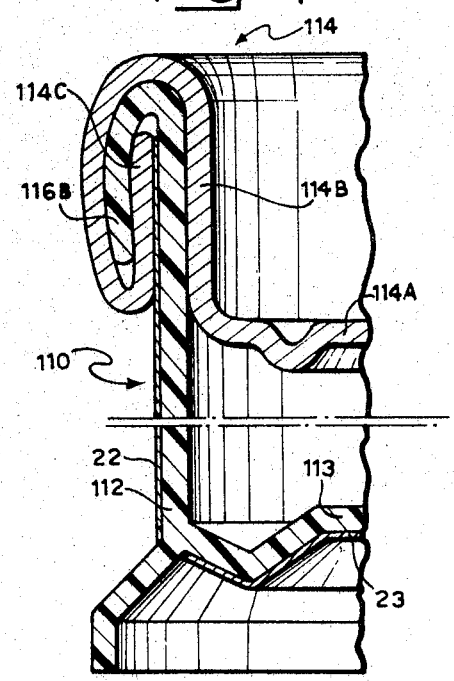

United States Patent Office 3,524,568
Patented Aug. 18, 1970

3,524,568
PACKAGE FOR FOODSTUFFS
Giovanni Nughes, Monza, Italy, assignor to Star Stabilimento Alimentare S.p.A., Via Matteotti, Agrate Brianza (Milan), Italy, an Italian joint-stock company
Filed Mar. 5, 1968, Ser. No. 710,536
Claims priority, application Italy, Apr. 11, 1967, 51,278/67; Oct. 25, 1967, 53,492/67
Int. Cl. B65d 7/42
U.S. Cl. 220—67                                   9 Claims

ABSTRACT OF THE DISCLOSURE

A rigid, "can"-type, foodstuff package comprising polypropylene body and sheet-metal cover sealingly seamed together by seam-spinning process. The body is integrally formed with a flange of special profile providing a seam capable of successfully withstanding the stress from sterilization conditions.

---

The invention relates to the preservation of foodstuffs, more particularly meat or fish products, as well as a large number of other products, such as tomato concentrates, james, fruit juices and the like.

More particularly, the invention concerns the packaging of the said products in containers of the "can"-type, comprising a substantially rigid body sealingly closed by a cover seamed thereto. Typically, in such packages, the body is of circular cylindrical shape; however, it may be of other shapes, such as a truncated pyramid having a rectangular base with rounded corners, typically employed for corned beef. Moreover, the invention particularly concerns packaging of foodstuffs which, after canning, shall undergo a treatment at elevated temperature, more particularly sterilization which is usually carried out at temperatures of about 120–125° C.

The technique of sterilization of meat was opened by Apert in 1810 by the use of tin plate cans. However, tin plate cans impart to the contents a metallic taste and, moreover, the sulfuretted aminoacids contained in the meat generate hydrogen sulphide which attacks the tin plate superficially at least, forming tin and iron sulphides which further adversely affect both the taste of the contents and aspect of the package.

Various attempts have been made at avoiding these drawbacks. Thus, the inner surfaces of the body and cover were coated with varnishes of various kinds, but these attempts were not fully satisfactory both owing to the porosity of the experimented coatings and insufficient adherence of the coatings to the metallic substrate. Recently, certain improvements were attained with the use of epoxy varnishes which, however, impart a bitter and disagreeable shade of taste to the canned product.

Aluminum containers were tried too but, apart from their relatively high cost, aluminum was found to be easily subject to corrosion by the products of a pH-value lower than 5 and by salted products. Moreover, aluminum cans are easily subject to buckling and ensuing leakage at the roller seam. Various combinations were moreover tried, comprising a body of tinplate and an aluminum cover; however, this attempt also was unsuccessful, mainly due to the formation of galvanic elements between the two different metals (more particularly with slightly acidic products) and ensuing corrosions and perforations.

Therefore, as a matter of fact, preserved-foodstuff manufacturers still follow the course opened by Apert, that is, the use of tinplate cans. As a consequence, and apart from the already above-described drawbacks, retailers and purchasers are often confronted by "blown-up" cans (manifestly a symptom of a deteriorated and toxic product) without mentioning frequent cases of food-poisoning. Applicant's thorough research work showed that such damages are mainly due to the stress under sterilization and subsequent cooling conditions undergone by the region at which the cover seam meets the longitudinal weld-seam of the body; this stress often leads to the formation at this region of initially non-detectable micro-leakages which, sooner or later, may lead to damage or, at least, contamination of the contents. Finally, since the longitudinal weld-seam of the tinplate body portion is made by employing an alloy usually containing 98% lead and 2% tin, lead traces may easily be absorbed by the can contents.

The problem is further complicated by the circumstance that the factories operating throughout the world are by far mostly equipped with machines for cover seaming by the spinning process, so that fondness of this industry for the conventional tinplate cans and mistrust towards novel solutions (which cannot be carried out by the said machines) do not appear wholly unjustified.

The main object of the invention is to satisfactorily solve in a practical manner all abovementioned problems, possibly without neglecting the economic aspects.

The invention therefore provides a package for foodstuffs, comprising a rigid container formed by a body and a cover sealingly seamed to the body, having the characteristic feature that the body of the container is integrally molded from polypropylene with a continuous circumferential outturned flange all around the open end of the body, the container cover consisting of a sheet metal stamping forming with said end of the body a spun seam, in which the flange is bent back to provide one of the hook-sections in the seam.

As distinct from a large number of other tested thermoplastic polymers (including, for instance, polyethylene, superpolyamides, vinyl polymers, copolymers of the ABS type and others), polypropylene was found to be the only one suitable for the purposes of the invention. More particularly, it does not impart any disagreeable odor, smell or taste, nor otherwise affects foodstuffs with which it is in contact; in addition, it can be injection molded or vacuum formed without requiring plasticizers or other substances deleterious to the foodstuff. Moreover, it was ascertained that with a thickness not smaller than about 0.25 mm., polypropylene is practically gas-impervious. Since, with rigid containers to which the invention relates, a thickness is required (for mechanical reasons) not smaller than about 0.3–0.4 mm., the problem of gas-proofness may be considered to be actually solved. If desired, even absolute gas-impermeability may be ensured by providing on the outer surface of the can body with a barrier layer, as described hereinafter.

What is most surprising, however, is the attitude of polypropylene, whether isotactic or not, to form an efficient seam by the spinning process in combination with a sheet metal stamping, for instance aluminum or tinplate, such as the cover of the container according to the invention, on conventional seaming machines embodying the so-called spinning process (compare for example "Machinery's Encyclopedia," vol. V, p. 329, editor The Industrial Press, New York, 1929). Other thermoplastic polymers, such as polyethylene, nylon or ABS form unsatisfactory seams, which do not withstand the pressure and temperature conditions at the sterilizing step. However, under certain circumstances, even with propylene satisfactory seams between the body and cover of the container may be difficult to obtain; in workshop language, the seaming machine could be said to "badly support" or to "suffer from" the flanged edge of the propylene body. However, it has been found that this eventuality may be avoided in any case by adopting a unique but very simple measure. More particularly, according to the preferred embodiment of the invention, the above-mentioned flange merges into the wall of the body by an arcuate transition zone (the term "arcuate" referring herein to the profile in longitudinal cross-section) and grows progressively thinner starting from the said zone towards the free edge of the flange, the dorsal curvature radius of said transition zone advantageously amounting to 1.5–2.5 times the thickness of said wall. With a flange of this configuration seaming is totally exempt from difficulties, not only, but sealing efficiency of the seam against internal pressure is improved by an extent such that, theoretically at least (that is, if possible deformations of the seam due to shocks in transport or delivery to the markets were neglected), the layer of putty which is usually applied to sealingly fill the seams, may be dispensed with.

Further characteristic features and advantages of the invention will result from the following description with reference to the accompanying drawing given by way of example only, wherein:

FIG. 1 is an elevational view of the polypropylene body and metal cover of a can according to the invention before seaming;

FIG. 2 is a fragmentary longitudinal cross-sectional view showing on an enlarged scale the configuration of the flange on the body;

FIG. 3 is a fragmentary longitudinal cross-sectional view showing the body and cover after seaming;

FIG. 4 is a fragmentary longitudinal cross-sectional view showing a modified embodiment.

The can shown on the drawings comprises a circular cylindrical body 10 and a cover 14. The body 10 comprises a circumferential wall 12 integrally molded with the bottom wall 13 and with an outturned continuous circumferential flange 16 encircling the open end of the body 10. The material of the body 10 is isotactic polypropylene of the following properties:

Softening point (ASTM D1525–58T) __° C__  >150
Melting point _____° C__  164–170
Glass-transition point _____° C__  −35
Distortion temperature 66 p.s.i. (ASTM 4648–56) _____° C__  100–130
Linear expansion coefficient (ASTM D696–44) _____ 110×10⁻⁶
Specific heat (20°–60° C.)_____cal./° C__  0.46
Heat conductivity _____ 2.1×10⁻⁷

Assuming the can as shown should contain for instance 100–200 g. corned beef, the thickness S of the wall 12 typically amounts to about 0.4–0.5 mm., so that the body 10 is substantially rigid; of course, an accordingly greater thickness S will be adopted for larger cans. The body 10 as shown is injection moldable; however, its configuration may be such that it can be molded by vacuum-forming from a polypropylene sheet by employing suitably shaped molds for forming the flange 16.

As will be seen in FIG. 2, the flange 16 merges into the wall 12 by a transition zone R of arcuate profile, and gradually decreases in thickness starting from the base B of the zone R. At the free end 16A the flange thickness preferably amounts to not more than ⅕–1/10 the thickness S of the wall 12. The radius of curvature of the dorsal surface D of the zone R is advantageously of the order of 1.5–2.5 times the thickness S; a thickness below 1.5×S leads to a substantially worse seam with the cover 14.

The cover 14 is pressed from sheet metal such as tinplate or aluminum sheet; the thickness of the sheet metal and profile of the cover are those conventionally adopted in the art and such that the cover is substantially stiff. For instance, in the specific case of 100–200 g. cans considered hereinbefore the thickness of the sheet metal typically amounts to 0.15–0.20 mm. The cover 14 is in the form of a circular disc, in which the central region 14A matching the mouth of the body 10 is depressed on stamping to provide a circular shoulder 14B adapted to fit like a stopper into the open end of the body 10.

Thus, in the packaging process, after having filled the body portion 10 with its respective dose of the product to be canned, the body 10 is conveyed to the seaming machine of the hereinbefore described type which fits the cover 14 thereto and forms the seam by the spinning process. As is known, at the seaming step a rotary disc is fitted into the recess 14E, FIG. 3, in the cover and axially presses the latter so that the circumferential edge 14F of the cover firmly bears on the flange 16. As the can is rotated about its own axis, a plurality of suitably shaped rollers engage and roll the edge 14F. During this process the shoulder 14B is radially supported by the said disc and therefore radially backs-up from the inside the corresponding end zone of the wall 12 of the body. At the same time the abovementioned rollers deform the edge 14F and flange 16 to their final configuration shown in FIG. 3, in which the flange takes a bent back shape 16B, that is, a hook-shape engaging the hook portion 14C of the cover edge 14. During deformation, the flange 16 undergoes an increase in thickness while, the transition zone R is stretched whereby a molecular orientation is achieved at this zone. According to the most credible assumption these two factors combined with the inherent properties of polypropylene and the lip shape (FIG. 2) of the flange 16 are primary factors conferring strength and tightness to the seam. Experimental tests disclosed that this seam withstands with a wide safety margin internal pressures of the order of two atmospheres, even at temperatures of 120–125° C. without any subsequent deleterious effects.

Though not explicitly shown in FIGS. 1 to 3, it is obvious that, in a typical embodiment of the packaging process, the lower face of the edge 14F of the cover 14 will be preferably coated with a layer of cement or putty for most efficient sealing. Moreover, as usual, the whole inwardly facing surface 14D of the cover 10 may be coated with a thin layer of insulating paint or lacquer for insulation against the can contents.

In FIG. 4 similar or equivalent parts to those previously described with reference to FIGS. 1 to 3 are denoted by the same reference numerals increased by 100. In this modified embodiment barrier layers 22, 23, respectively, are provided on the outer surface of the wall 112 of the body 110 and on the outer face of the bottom section 113. The layers 22, 23 are primarily intended to protect the can contents as well as the propylene body 110 against the action of light, in view of the fact that the propylene resin from which the body is molded is obviously free from plasticizers, coloring and similar matter, the presence of which might adversely affect preservation of the product. However, the layers 22, 23 might be also or only intended to improve impermeability of the body 110 to gases or fluids generally, more particularly when the protection against light is of no significant importance. In the latter case, each of the layers 22, 23 may samply consist of a film of an epoxy or epoxy-phenol varnish.

Metal barrier layers, more particularly of aluminum are recommendable for protection against light. A thin, though efficient aluminum barrier layer may be obtained by electrodeposition of vacuum spray coating by techniques known per se. Alternatively, a band of aluminum foil may be adhered to the wall 112 to form the layer 22 and a disc punched from aluminum foil may be adhered to the bottom 113 to act as barrier layer 23. However, in both cases the metal coating should subsequently be protected by means of a protective film or coating of plastics, such as polyethylene terephthalate.

According to a particularly convenient embodiment of the invention the barrier layers 22, 23 are formed by a band and a disc, respectively, severed from a thin flexible triple laminate comprising aluminum foil as a middle layer, the two outer layers each being a film of polyester resin, polyvinylidene chloride or polypropylene. In a triple laminate of this kind the aluminum foil may be initially printed or embossed with patterns, inscriptions or other identification marks for the product, making a subsequent labelling of the package superfluous.

It will be understood that the can according to the invention shall not necessarily be of circular cylindrical shape as shown on the drawings, as all above disclosed teachings may be employed in connection with all can forms, for instance flat elliptical, rectangular with rounded angles form, etc., falling within the current notion of cans and being therefore suitable for cover seaming by the spinning process.

The invention affords a number of important advantages. Firstly, tests carried out over periods exceeding one year (on a great variety of products, such as meat, fruit, vegetables, peeled tomatoes, tomato concentrates) disclosed a standard of preservation remarkably higher than the standard obtainable with tinplate cans. The steel efficiency and strength of the seam against the sterilization stress were found extremely satisfactory, also owing to the absence of the longitudinal welded seam. In the absence of such weld, consequently of lead, there is no risk of this toxic material going over into the packaged product. From an economical standpoint it should be noted that, as compared with conventional tinplate cans, the cans according to the invention are cheaper and lighter in weight. A production line (100,000 workpieces daily) for these cans represents ⅙ to ⅐ only of the cost of a similar line for manufacturing equivalent tinplate cans and requires but ⅕ manpower. At the same time, no substantial modifications in the structure of the seaming machines, filling and sterilization or transport and stockage plants, as presently in use by manufacturers of canned products are required. It is further evident that, as distinct from the manufacturing lines for tinplate cans, one or more presses for molding the containers according to the invention may easily be installed in the factory manufacturing the canned product itself, in order to directly meet daily requirements, thereby avoiding transportation costs, huge space requirement for empty cans and work for stacking the empty cans as they reach the storage facilities.

What I claim is:

1. A plastic container of the can type suitable for foods requiring sterilization or pasteurization, the container being of cup shape having an integral bottom and side walls, the top of the side walls being generally circumferentially flanged to receive a stamped sheet metal cover spun seamed thereon by conventional means to sealingly close the mouth of the container, the plastic container having the improvements comprising: the container being formed of injection molded polypropylene with a wall thickness such that the container walls are substantially rigid, the circumferential flange injection molded integrally with the side walls in a configuration in which the top surface of the flange extends outwardly of the container in the plane of the mouth of the container, the flange merging with the wall in a transition zone arcuate in section, the thickness of the flange uniformly and continuously tapering from the transition zone to the free edge of the flange with a thickness at the free edge of the flange not more than ⅕ the thickness of the container wall.

2. The plastic container as in claim 1 wherein the molded container is of injection molded isotactic polypropylene with walls at least 0.4 mm. in thickness to provide the rigidity.

3. A plastic container as in claim 1 wherein the arcuate transition zone has a radius of curvature of the inside surface of the walls about 1.5 to 2.5 times the thickness of the container walls.

4. A plastic container as in claim 1 wherein the outside surface of the container bottom and walls is coated with barrier layers.

5. A plastic container as in claim 4 wherein the barrier layer consists of a film chosen from the group of epoxy and epoxy-phenol varnish.

6. A plastic can as in claim 4 wherein the barrier layer is aluminum.

7. A plastic can as in claim 6 wherein the aluminum barrier layer is coated on the outside of the container walls.

8. A plastic can as in claim 6 wherein the aluminum barrier layer is aluminum foil adhered to the outside of the container walls.

9. A plastic can as in claim 4 wherein the barrier layer is formed of a triple laminate comprising aluminum foil as a middle layer and the outer layers being a film of material chosen from the group of polyester resin, polyvinyl chloride and polypropylene.

References Cited

UNITED STATES PATENTS

| | | | |
|---|---|---|---|
| 1,824,907 | 9/1931 | Lermer | 229—5.6 |
| 2,150,058 | 3/1939 | Frazier. | |
| 2,156,987 | 5/1939 | Hill. | |
| 2,321,408 | 6/1943 | Mills | 220—67 |
| 3,051,580 | 8/1962 | Brennan | 99—171 |
| 3,056,762 | 10/1962 | Tringali. | |
| 3,230,093 | 1/1966 | Albertus. | |
| 3,405,439 | 10/1968 | Uemura | 220—67 X |
| 3,410,939 | 11/1968 | Driza | 220—67 X |
| 3,448,066 | 6/1969 | Parker | 99—181 X |

FOREIGN PATENTS

| | | |
|---|---|---|
| 1,462,048 | 11/1966 | France. |
| 564,054 | 1/1967 | Italy. |

FRANK W. LUTTER, Primary Examiner

W. L. MENTLIK, Assistant Examiner

U.S. Cl. X.R.

99—171; 229—5.6.